(12) United States Patent
Wang et al.

(10) Patent No.: US 10,499,415 B2
(45) Date of Patent: Dec. 3, 2019

(54) BASE STATION AND USER EQUIPMENT FOR MOBILE COMMUNICATION SYSTEM

(71) Applicant: Institute For Information Industry, Taipei (TW)

(72) Inventors: Hai-Han Wang, Taipei (TW); Chun-Che Chien, Taipei (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 16/148,662

(22) Filed: Oct. 1, 2018

(65) Prior Publication Data

US 2019/0104536 A1 Apr. 4, 2019

Related U.S. Application Data

(60) Provisional application No. 62/566,556, filed on Oct. 2, 2017.

(51) Int. Cl.
*H04W 4/00* (2018.01)
*H04W 72/12* (2009.01)

(52) U.S. Cl.
CPC ... *H04W 72/1268* (2013.01); *H04W 72/1289* (2013.01)

(58) Field of Classification Search
CPC .............. H04W 72/1268; H04W 72/1289
USPC ...... 370/329–330, 335–349; 455/422.1–425, 455/445, 450–454
See application file for complete search history.

(56) References Cited

U.S. PATENT DOCUMENTS

| | | | |
|---|---|---|---|
| 2015/0043476 A1* | 2/2015 | Takeda | H04L 5/0053 370/329 |
| 2017/0257772 A1* | 9/2017 | Zhou | H04L 5/001 |
| 2018/0035458 A1 | 2/2018 | Islam et al. | |
| 2018/0035459 A1 | 2/2018 | Islam et al. | |
| 2018/0097607 A1* | 4/2018 | Ji | H04B 7/26 |
| 2019/0182012 A1* | 6/2019 | Liu | H04L 5/0055 |
| 2019/0215781 A1* | 7/2019 | Jeon | H04W 24/10 |

FOREIGN PATENT DOCUMENTS

TW 201844048 A 12/2018

OTHER PUBLICATIONS

Office Action to the corresponding Taiwan Patent Application No. 107134679 rendered by the Taiwan Intellectual Property Office (TIPO) dated Aug. 8, 2019, 8 pages.

* cited by examiner

*Primary Examiner* — Thai D Hoang
(74) *Attorney, Agent, or Firm* — Skaar Ulbrich Macari, P.A.

(57) ABSTRACT

A base station (BS) and a user equipment (UE) for a mobile communication system are provided. The BS transmits first downlink control information (DCI) indicating a first uplink radio resource to a UE and transmits second DCI indicating a second uplink radio resource to another UE. The second uplink radio resource has an overlapping part with the first uplink radio resource. The BS further transmits third DCI to the UE in response to the overlapping part. The third DCI indicates transmission adjustment information.

21 Claims, 12 Drawing Sheets

BASE STATION AND USER EQUIPMENT FOR MOBILE COMMUNICATION SYSTEM

PRIORITY

This application claims priority to U.S. Provisional Patent Application No. 62/566,556 filed on Oct. 2, 2017, which is hereby incorporated by reference in its entirety.

FIELD

The present invention relates to a base station (BS) and a user equipment (UE) for a mobile communication system. More particularly, the BS can re-allocate a part of the uplink radio resource, which has been allocated to the UE with low priority, to the UE with high priority for transmitting the uplink signal and make the UE with low priority cancel the transmission of the uplink signal on the part of the uplink radio resource in case that the available uplink radio resources are insufficient.

BACKGROUND

With the rapid development of wireless communication technologies, wireless communication has found wide application in people's life, and people's demand for wireless communication is increasing. To satisfy various applications in daily life, the next generation of mobile communication system (which is generally referred to as the 5G mobile communication system currently) has proposed new service types, e.g., Ultra-reliable and Low Latency Communication (URLLC), Enhanced Mobile Broadband (eMBB) communication, and Massive Machine Type Communication (mMTC).

Because the UE supporting URLLC service (which is called a URLLC UE hereinafter) essentially has the sporadic characteristics in the uplink signal transmission, the BS is unable to timely allocate the uplink radio resource to the URLLC UE for transmitting the uplink signal if the uplink radio resources within the tolerable latency range of the URLLC UE have been scheduled and allocated to the other UEs, especially for transmitting some uplink control signals (e.g., the Hybrid Automatic Repeat Request (HARQ) feedback signal). For those uplink control signals, the BS does not schedule the radio resources for the UE to transmit the uplink control signals in a fixed time-frequency position in relation to the downlink data transmission. Instead, the BS dynamically indicates the radio resources for the UE to transmit the uplink control signals through the downlink control information (DCI).

Besides, the BS may reserve some uplink radio resources for common use by the URLLC UE and the UE supporting eMBB service (which is called an eMBB UE hereinafter) so that the URLLC UE can select an uplink radio resource from the reserved uplink radio resources and transmit the uplink signal immediately on the selected uplink radio resource in an uplink grant-free way depending on the transmission need thereof. However, if the uplink radio resource selected by the URLLC UE has been completely or partially allocated to the other UE (e.g., the other URLLC UE or eMBB UE) by the BS, the collision in uplink signal transmission will occur.

Accordingly, an urgent need exists in the art to provide an uplink radio resource scheduling and allocation mechanism to make the URLLC UE able to timely obtain the required uplink radio resource for transmitting the uplink signal even when the uplink radio resources within the tolerable latency range of the URLLC UE have been scheduled and allocated to the other UE, thereby improving the radio resource utilization efficiency and meeting the requirement of ultra-reliability and low latency.

SUMMARY

An objective of the present invention is to provide an uplink radio resource scheduling and allocation mechanism, which enables a base station to re-allocate a part of the uplink radio resource, which have been allocated to the other UE, to the URLLC UE when the URLLC UE needs to timely transmit the uplink signal, and enables the base station to command the other UE to cancel the transmission on the part of the uplink radio resource. In this way, the present invention enables the UE with shorter tolerable latency to timely obtain the uplink radio resource for transmitting the uplink signal without raising the collision issue in uplink signal transmission, thereby improving the radio resource utilization efficiency and meeting the requirement of ultra-reliability and low latency.

To achieve the aforesaid objective, the disclosure includes a base station (BS) for a mobile communication system. The BS comprises a storage, a transceiver and a processor. The processor is electrically connected to the storage and the transceiver, and is configured to execute the following operations: transmitting first downlink control information (DCI) to a user equipment (UE) via the transceiver, the first DCI indicating a first uplink radio resource for the UE to transmit a first uplink signal; transmitting second DCI to another user equipment (UE) via the transceiver, the second DCI indicating a second uplink radio resource for the UE to transmit a second uplink signal, the second uplink radio resource having an overlapping part with the first uplink radio resource; and transmitting third DCI to the UE in response to the overlapping part, the third DCI indicating transmission adjustment information.

The disclosure also includes a user equipment (UE) for a mobile communication system. The UE comprises a storage, a transceiver and a processor. The processor is electrically connected to the storage and the transceiver, and is configured to execute the following operations: receiving DCI from a base station (BS) via the transceiver, the DCI indicating a first uplink radio resource for the UE to transmit a first uplink signal; and receiving another DCI from the BS via the transceiver, the another DCI indicating transmission adjustment information and being generated by the BS in response to allocating a second uplink radio resource to another UE, the second uplink radio resource having an overlapping part with the first uplink radio resource.

The disclosure further includes a user equipment (UE) for a mobile communication system. The UE comprises a storage, a transceiver and a processor. The storage is configured to store a first identifier of the UE. The processor is electrically connected to the storage and the transceiver, and is configured to execute the following operations: receiving group information from a base station (BS) via the transceiver, the group information including a second identifier of another UE; receiving first DCI from the BS via the transceiver based on the first identifier, the first DCI indicating a first uplink radio resource for the UE to transmit a first uplink signal; receiving second DCI from the BS via the transceiver based on the second identifier, the second DCI indicating a second uplink radio resource for the another UE to transmit a second uplink signal; determining whether the second uplink radio resource has an overlapping part with the first uplink radio resource; and deciding whether to transmit the first uplink signal and deciding a transmission method for transmitting the first uplink signal based on whether the overlapping part exists.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof. These example embodiments are not intended to limit the present invention to any particular example, embodiment, environment, applications or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
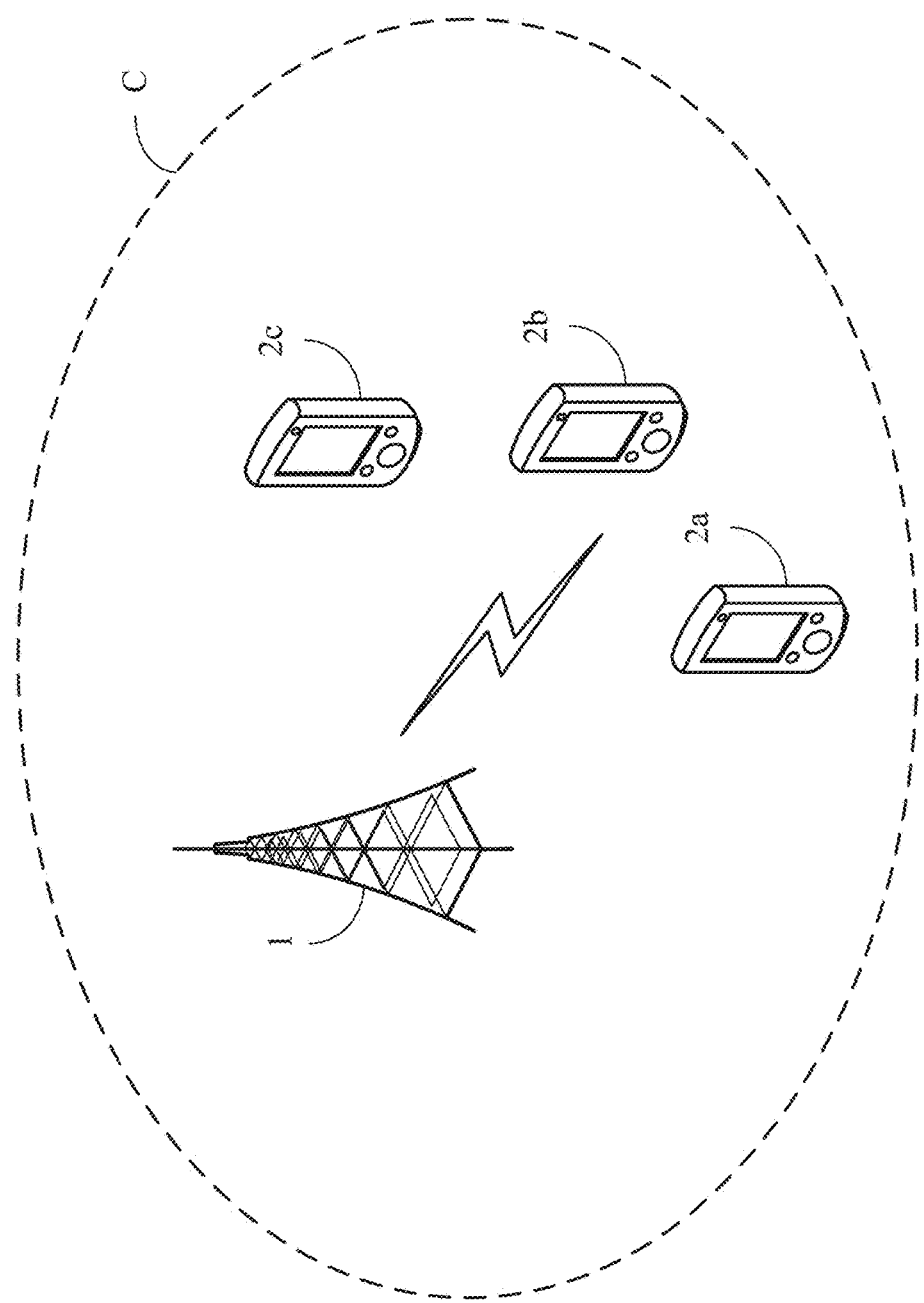
FIG. 1 depicts an implementation scenario of a communication system according to the present invention.
Figure 2:
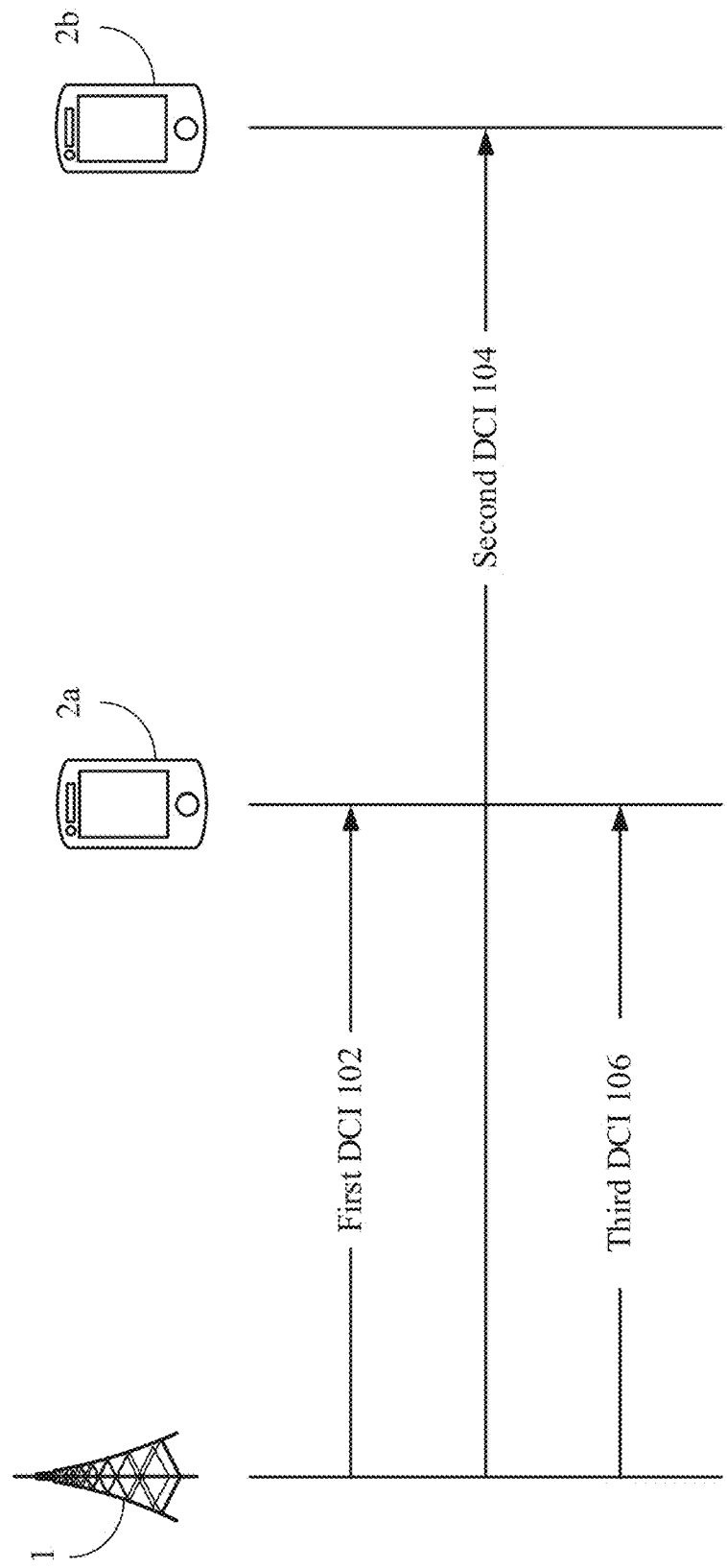
FIG. 2 depicts an implementation scenario of signal transmission between the BS 1 and the UEs 2a, 2b according to the present invention.

A first embodiment of the present invention is as shown in FIGS. 1 to 2 and FIGS. 3A to 3D. FIG. 1 depicts an implementation scenario of a communication system according to the present invention. FIG. 2 depicts an implementation scenario of signal transmission between the BS 1 and the UEs 2a, 2b according to the present invention. To simplify the description, signal transmission between the BS 1 and the UEs 2a, 2b is taken as an example in FIG. 2 for illustration, and signal transmission between the BS 1 and other UEs shall be appreciated by those of ordinary skill in the art based on the following description and thus will be not further described herein.

As shown in FIG. 1, the BS 1 in a wireless communication system has a signal coverage C, and the UEs 2a, 2b and 2c are all within the signal coverage C. To simplify the description, only three UEs 2a, 2b and 2c are depicted in FIG. 1. However, the number of UEs within the signal coverage C of the BS 1 is not intended to limit the scope of the present invention. The wireless communication system may be the next generation of mobile communication systems (broadly called 5G mobile communication systems currently) or any mobile communication systems based on the orthogonal frequency division multiple access (OFDMA) technology. Each of the UEs 2a, 2b and 2c may be a smart phone, a tablet computer or any mobile communication device conforming to specifications of the mobile communication system, e.g., a UE supporting an ultra-reliable low latency communication (URLLC) service (which is called a URLLC UE hereinafter) or a UE supporting an enhanced mobile broadband (eMBB) service (which is called an eMBB UE hereinafter), but not limited thereto.

The BS 1 transmits first downlink control information (DCI) 102 to the UE 2a. The first DCI 102 indicates a first uplink radio resource for the UE 2a to transmit a first uplink signal. In this embodiment, the first uplink signal is an uplink control signal (i.e., first uplink control information (UCI)), and the first uplink radio resource is located on a physical uplink control channel (PUCCH). Besides, the BS 1 transmits second DCI 104 to the UE 2b. Similarly, the second DCI 104 indicates a second uplink radio resource for the UE 2b to transmit a second uplink signal. The second uplink signal is also an uplink control signal (i.e., UCI), and transmitted on the second uplink radio resource of the PUCCH.

Specifically, the BS 1 would configure multiple PUCCH resources (including the aforesaid first and second uplink radio resources), and each PUCCH resource has corresponding parameters (e.g., the PUCCH format, the time-frequency position). When a UE establishes the connection with the BS 1, the BS 1 would inform the UE of the multiple configured PUCHH resources through the higher layer signaling, e.g., through the radio resource control (RRC) message. Afterwards, when the UE needs to transmit the uplink control signal, the BS 1 schedules and allocates the radio resource and informs the UE of which PUCCH resource can be used through the DCI, that is to say, the DCI has the index of the PUCCH resource for indicating the uplink radio resource allocated to the UE.

In this embodiment, the UE 2a can transmit the first uplink signal (not shown) on the first uplink radio resource after learning the first uplink radio resource allocated by the BS 1 according to the first DCI 102, and the UE 2b can transmit the second uplink signal (not shown) on the second uplink radio resource after learning the second uplink radio resource allocated by the BS 1 according to the second DCI 104. It shall be appreciated that, this embodiment takes that the BS 1 pre-configures the PUCCH resources and the DCI carries the relative information (i.e., the index) about the PUCCH resource as an example; however, in other embodiments, the BS 1 may not need to pre-configure the PUCCH resources and the DCI may carry the absolute information about the PUCCH resource to directly indicate the uplink radio resource allocated to the UE.

Here it is assumed that the UE 2a has the lower priority than the UE 2b. For example, the UE 2a may be an eMBB UE or a URLLC UE with longer tolerable latency, and the UE 2b may be a URLLC UE whose tolerable latency is shorter than that of the UE 2a. In other words, this embodiment assumes that the UE 2b is in urgent need of transmitting the uplink control signal. For example, when the UE 2b is used for communication in Internet of Vehicles (IoV), the UE 2b may need to timely report the correctness of the received downlink data signal (e.g., report ACK/NACK based on the Hybrid Automatic Repeat Request (HARQ)), or may need to timely transmit other information (e.g., the BS 1 may ask the UE 2b to timely report the channel state information (CSI) in response to the downlink data transmission).

When the need of transmitting the uplink control signal as described above exists, the BS 1 would schedule and allocate the PUCCH resource to the UE 2b for transmitting the second uplink signal. In the present invention, if the current available PUCCH resources cannot meet the requirement of ultra-reliability and low latency transmission in the UE 2b (i.e., the allocated uplink radio resource of the PUCCH through the conventional scheduling and allocation mechanism cannot achieve the purpose of timely transmission in the UE 2b), the BS 1 can re-allocate a part of the PUCCH resource, which has already allocated to the other UE with lower priority, to the UE 2b. For example, the BS 1 can re-allocate a part of the first uplink radio resource, which has already allocated to the UE 2a, to the UE 2b, e.g., the gray-slash portion as shown in FIGS. 3A-3D.

FIGS. 3A-3D depict different implementation scenarios of the overlapping part of the uplink radio resources according to the present invention. Here it is assumed that in the mobile communication system of the present invention, every slot SL includes 14 OFDM symbols S1-S14, and the BS 1 decides and allocates the PUCCH resources to the UE 2a, 2b for transmitting the UCI based on the channel state, the code rate and the type and amount of the information that the UE 2a, 2b would like to transmit. Double allocating uplink radio resource would cause transmission collision. Thus, when the second uplink radio resource has an overlapping part with the first uplink radio resource, the BS 1 will transmit third DCI 106 indicating transmission adjustment information to the UE 2a in response to the overlapping part to avoid the transmission collision between the first uplink signal transmitted by the UE 2a and the second uplink signal transmitted by the UE 2b.

Figure 3A:
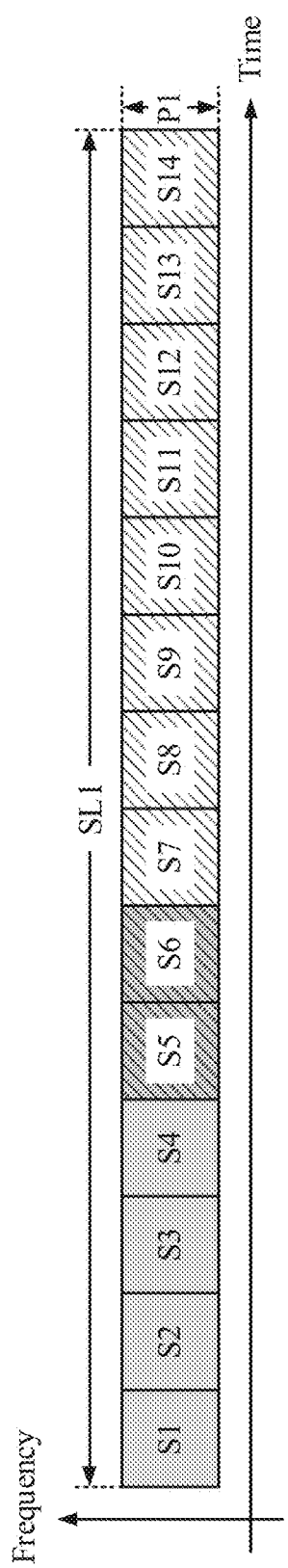
FIGS. 3A-3D depict different implementation scenarios of the overlapping part of the uplink radio resources according to the present invention.
Figure 3B:
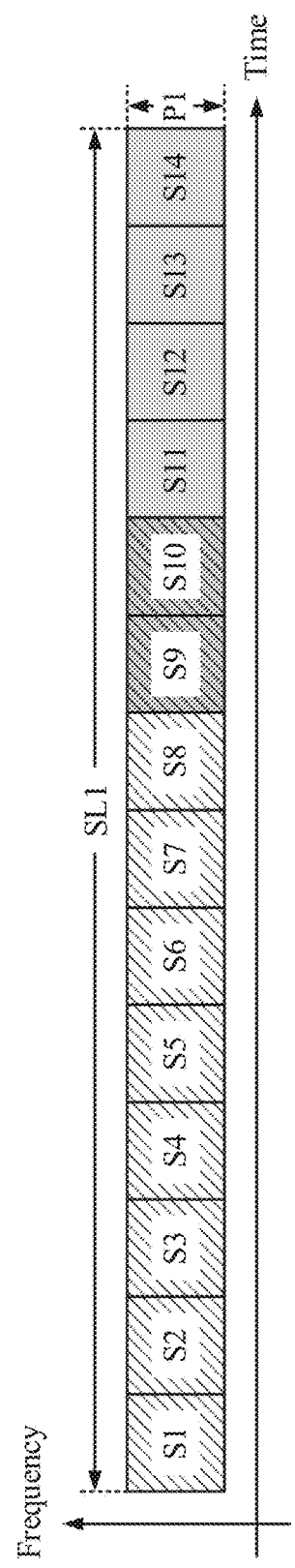

In FIG. 3A, it is assumed that BS 1 has allocated the PUCCH resource defined by the OFDM symbols S5-S14 in a slot SL1 and a physical resource block (PRB) P1 to the UE 2a. For urgent need, the BS 1 can also allocate the PUCCH resource defined by the OFDM symbols S1-S6 in the same slot SL1 and the same physical resource block (PRB) P1 to the UE 2b. Thus, the OFDM symbols S5-S6 are the overlapping part. In FIG. 3B, it is assumed that BS 1 has allocated the OFDM symbols S1-S10 in the slot SL1 to the UE 2a, and for urgent need, the BS 1 can also re-allocate the OFDM symbols S9-S14 to the UE 2b. Thus, the OFDM symbols S9-S10 are the overlapping part.

Figure 3C:
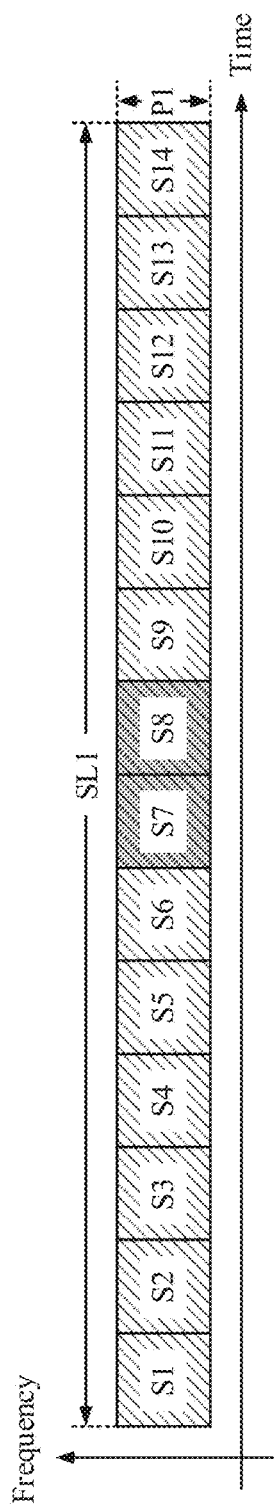

In FIG. 3C, it is assumed that BS 1 has allocated the OFDM symbols S1-S14 in the slot SL1 to the UE 2a, and for urgent need, the BS 1 can also re-allocate the OFDM symbols S7-S8 to the UE 2b. Thus, the OFDM symbols S7-S8 are the overlapping part. It shall be appreciated that, FIGS. 3A-3C are only the examples for illustrate the overlapping part, and those of ordinary skill in the art could appreciate that the PUCCH resources (i.e., the amount and position of the OFDM symbols) allocated to the UE 2a, 2b may vary according to the PUCCH formats (e.g., the long PUCCH format and the short PUCCH format) and scheduling mechanism; therefore, the overlapping part is not only limited to specific numbers of the OFDM symbols.

Figure 3D:
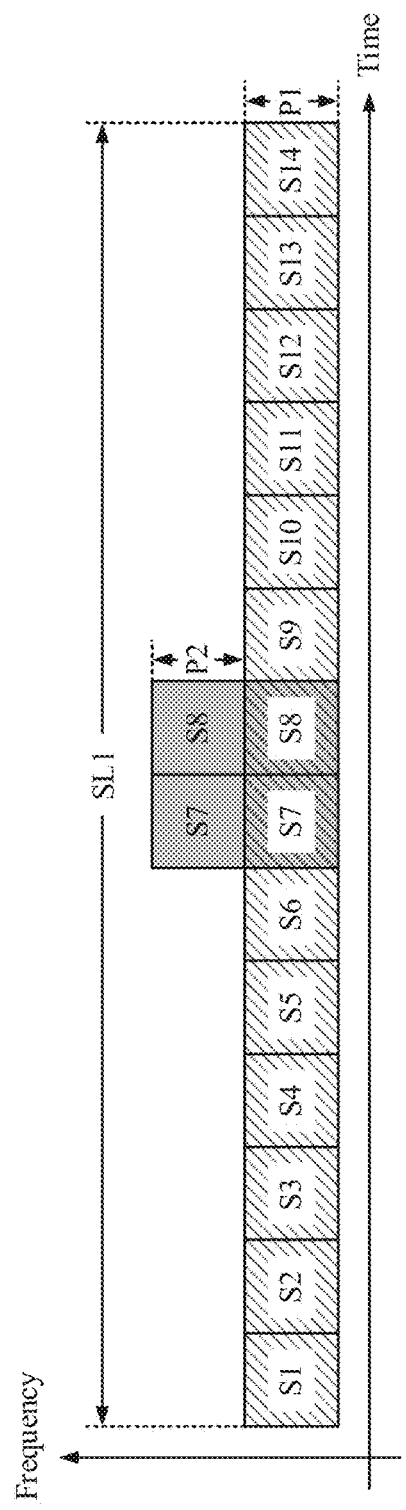

Besides, it shall be appreciated by those of ordinary skill in the art that, the PUCCH format for transmitting the UCI would be changed, depending on the amount of information (i.e., the number of bits) carried in the UCI transmitted by the UE. Thus, the PUCCH resource may also be defined by multiple PRBs in the frequency domain. As shown in FIG. 3D, the BS 1 may allocate the PUCCH resource (i.e., the second uplink radio resource) defined by two PRBs P1, P2 and the two OFDM symbols in one slot SL1 to the UE 2b, and the PUCCH resource allocated to the UE 2b also has the overlapping part with the PUCCH resource allocated to the UE 2a.

Please also refer to FIGS. 3A-3D for a second embodiment of the present invention. The second embodiment is an extension of the first embodiment. In this embodiment, each of the first DCI 102, the second DCI 104 and the third DCI 106 is UE-specific DCI. After receiving the third DCI 106, the UE 2a would adjust the way to transmit the first uplink signal on the first uplink radio resource. The transmission adjustment information in this embodiment is transmission cancellation information, e.g., preemption indication information. The UE 2a cancels transmitting a segment of the first uplink signal according to the transmission cancellation information, and the segment at least includes the overlapping part.

For example, in FIG. 3A, the UE 2a was going to use OFDM symbols S5-S14 to transmit the first uplink signal. However, before transmitting the first uplink signal, the UE 2a receives the third DCI 106 including the transmission cancellation information which indicates the OFDM symbol S1-S7 (i.e., a mini slot) could not be used to transmit the first uplink signal. Therefore, based on the transmission cancellation information, only the segment of the first uplink signal corresponding to the OFDM symbols S8-S14 is transmitted by the UE 2a, and the segment of the first uplink signal corresponding to the OFDM symbols S5-S7 is not transmitted by the UE 2a to avoid the OFDM symbols S5-S7 to be used by the UEs 2a, 2b for transmitting the uplink signals at the same time. In other words, the BS 1 instructs the UE 2a to give up the OFDM symbols S5-S6 to the UE 2b by transmitting the third DCI 106 to the UE 2a.

The above example illustrates the segment of the first uplink signal, which is canceled and not to be transmitted, is larger than the overlapping part between the first and second uplink radio resources. In such situation, although the overlapping part only includes OFDM symbol S5-S6, the UE 2a also cannot use the OFDM symbol S7 to transmit the first uplink signal. However, in other embodiments, the transmission cancellation information may indicate precise information, e.g., exactly indicating that the OFDM symbols S5-S6 cannot be used to transmit the first uplink signal; that is to say, the segment of the first uplink signal which is canceled and not to be transmitted completely corresponds to the overlapping part. Thus, if the transmission cancellation information can precisely indicate the overlapping part, the OFDM symbol S7 can also be used by the UE 2a to transmit the first uplink signal without wasting the radio resource corresponding to the OFDM symbol S7.

It shall be noted that, this embodiment assumes that even the UE 2a does not transmit the segment, which at least includes the overlapping part, of the first uplink signal (e.g., the OFDM symbols S5-S6 or the OFDM symbols S5-S7), the BS 1 can still decode the contents of the first uplink signal. In other words, those of ordinary skill in the art can appreciate that, it is tolerable for a larger part of the first uplink signal being received incorrectly if the contents of the first uplink signal are encoded at a lower code rate so that even a part of the first uplink signal are not transmitted, there is a high probability that the contents of the first uplink signal still can be decoded by the BS 1 based on the other received part of the first uplink signal.

In other embodiment, the transmission adjustment information is transmission power adjustment information so that the UE 2a adjusts transmission power for transmitting the first uplink signal according to the transmission power adjustment information (e.g., reducing the transmission power). In this way, the UE 2a still may use the PUCCH resource originally-allocated to transit the first uplink signal, and the BS 1 may perform demodulation and decoding on the uplink signals sequentially based on different powers of the uplink signals received from different UEs. In other words, after the power of the first uplink signal has been reduced, the BS 1 may demodulate and decode the second uplink signal with higher transmission power first, and then demodulate and decode the first uplink signal after subtracting the signal component of the second uplink signal corresponding to the overlapping part from the first uplink signal. Besides, in other embodiment, the he UE 2a may only adjust the transmission power corresponding to the OFDM symbols (e.g., the OFDM symbols S5-S6 or the OFDM symbols S5-S7) included in the OFDM symbols indicated by the transmission cancellation information.

Besides, in other embodiment, BS 1 may further use the second DCI to indicate another transmission power adjustment information so that the UE 2b adjusts transmission power for transmitting the second uplink signal according to the another transmission power adjustment information (e.g., increasing the transmission power of the second uplink signal). In this case, the probability that both the first and second uplink signal are successfully decoded by the BS 1 will be raised.

Besides, in other embodiment, in the case that the UE 2b transmits the second uplink signal in an uplink grant-free way, the second DCI 104 may indicate information about the following: (i) the reception of the uplink grant-free configuration RRC message containing information about the second uplink radio resource for transmitting the second uplink signal; (ii) the activation of the second uplink radio resource for using the second uplink radio resource to transmit the second uplink signal; (iii) the slot format indicator (SFI) for informing that the activated second uplink radio resource can be used for uplink transmission; or (iv) the HARQ NACK for retransmitting the second uplink signal on the second uplink radio resource.

In another embodiment, the BS 1 further transmits a configuration message (not shown) to the UE 2a through the higher layer signaling. The configuration message indicates a CORESET, a search space and at least one physical downlink control channel (PDCCH) candidate. Thus, the UE 2a can receive the third DCI 106 according to the configuration message. Moreover, to reduce the effort to monitoring the third DCI 106 at the UE 2a, the BS 1 may configure the discontinuous monitoring time pattern or the limited PDCCH candidates. For example, the BS 1 may limit the PDCCH candidates to the first one or two candidates of the configured search space.

Figure 4:
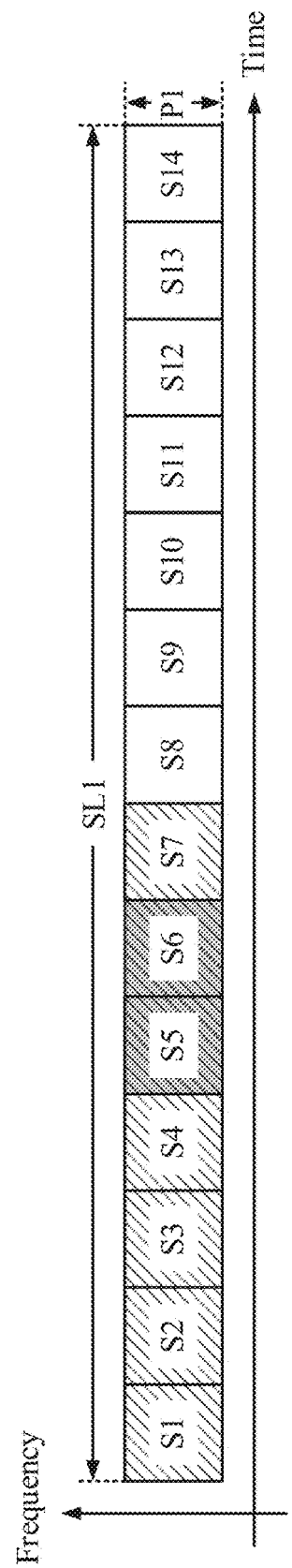
FIGS. 4 to 6 depict different implementation scenarios of transmission adjustment information according to the present invention.

A third embodiment of the present invention is as shown in FIG. 4. The third embodiment is an extension of the first embodiment. Unlike the second embodiment, the third DCI 106 in this embodiment is common DCI, and the transmission adjustment information is radio resource reservation information (e.g., the slot format indictor (SFI) information). The UE 2a cancels transmitting a segment of the first uplink signal according to the radio resource reservation information, and the segment at least includes the overlapping part. For example, as shown in FIG. 4, the OFDM symbols S1-S7 in the slash portion are the OFDM symbols which the BS 1 would like to reserve, and the OFDM symbols S5-S6 in the gray-slash portion are the overlapping part between the first and second uplink radio resources.

In the present invention, the SFI information can be used as the preemption indication information. The eMBB UE (e.g., the UE 2a) should cancel transmitting the segment (e.g., the OFDM symbols S5-S7) of the first uplink signal, where the segment corresponds to the reserved OFDM symbols. However, the URLLC UE (e.g., the UE 2b) can ignore the SFI information and still transmit the second uplink signal on the second radio resource (i.e., the OFDM symbols S1-S6) indicated by the second DCI.

Besides, in another embodiment, when the second DCI 104 transmitted from the BS 1 to the UE 2b is generated by cyclic redundancy check (CRC) scrambling with a specific radio network temporary identifier (RNTI), the UE 2b can ignore the SFI information.

Figure 5:
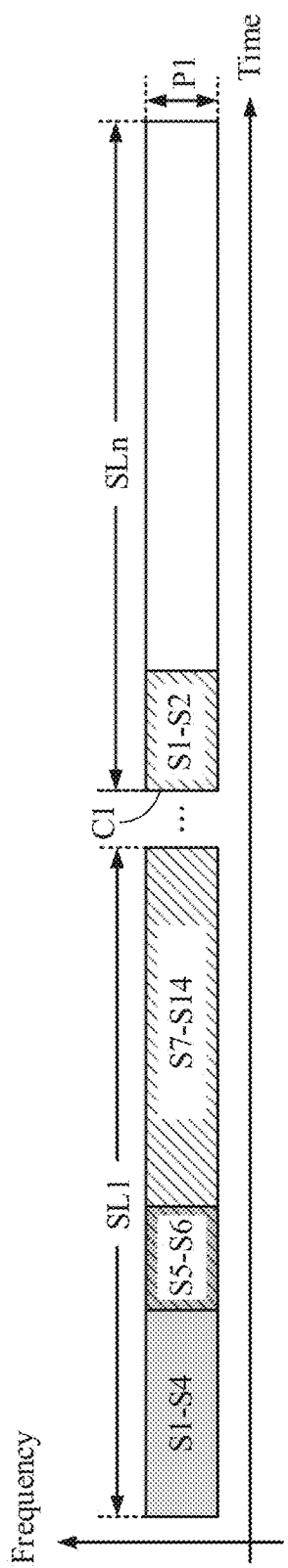

A fourth embodiment of the present invention is as shown in FIG. 5. The fourth embodiment is an extension of the first embodiment. Unlike the second and third embodiments, the transmission adjustment information in this embodiment includes radio resource re-scheduling information and transmission cancellation information. The transmission adjustment information makes UE 2a cancel transmitting a segment of the first uplink signal according to the radio resource reservation information, where the segment at least includes the overlapping part. Moreover, the transmission adjustment information makes UE 2a transmit the segment on the compensating uplink radio resource C1 (e.g., the OFDM symbols S1-S2 in the later slot SLn) indicated by the radio resource re-scheduling information accordingly.

For example, as shown in FIG. 5, the overlapping part between the first and second radio resources includes the OFDM symbols S5-S6, the UE 2a cancels using the OFDM symbols S5-S6 to transmit the first uplink signal according to the transmission cancellation information, and only uses the other OFDM symbols S7-S14 to transmit the first uplink signal. And, the UE 2a transmits the segment of the first uplink signal, which was originally going to transmit on the OFDM symbol S7-S8 in the slot SL1, on the compensating uplink radio resource C1 according to the radio resource re-scheduling information.

It shall be noted that, this embodiment takes the slot SL1 and the slot SLn corresponds to the same PRB P1 as an example; however, in other embodiment, the compensating uplink radio resource C1 may be located in the slot SLn corresponding to the different PRB.

Besides, although the above examples use the later slot SLn for illustration, it shall be appreciated by those of ordinary skill in the art that, the compensating uplink radio resource C1 may be located in the slot earlier than the slot SL1 as long as the UE 2a has enough time to process the third DCI indicating the re-scheduling information.

Figure 6:
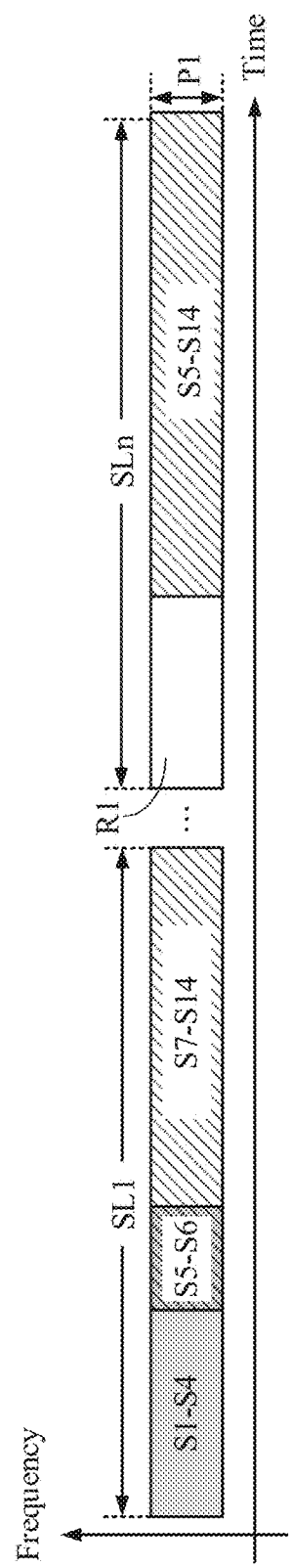

A fifth embodiment of the present invention is as shown in FIG. 6. The fifth embodiment is an extension of the first embodiment. Unlike the second to fourth embodiments, the transmission adjustment information in this embodiment is radio resource re-scheduling information which indicates an uplink radio resource R1 (e.g., the OFDM symbols S5-S14 in the later slot SLn) so that the UE 2a cancels transmitting the first uplink signal on the first uplink radio resource and transmits the first uplink signal on the re-allocated uplink radio resource R1 according to the radio resource re-scheduling information.

Specifically, if the UE 2a receives the third DCI 106 which indicates a HARQ process with the same HARQ process ID as the HARQ process indicated by the first DCI 102 before using the first uplink radio resource indicated by the first DCI 102 to transmit the first uplink signal, the UE 2a would take the third DCI 106 as the re-scheduling information. As a result, the UE 2a will cancel transmitting the first uplink signal on the first uplink radio resource and transmit the first uplink signal on the re-allocated uplink radio resource R1 according to the third DCI 106.

It shall be noted that, the aforesaid "before using the first uplink radio resource indicated by the first DCI 102 to transmit the first uplink signal" means that the time interval from the end of transmitting the third DCI 106 to the start of transmitting the first DCI 102 must be longer than the process time that the UE 2a needs to process the third DCI 106. Besides, in other embodiments, the aforesaid "before using the first uplink radio resource indicated by the first DCI 102 to transmit the first uplink signal" may mean that the time interval from the end of transmitting the third DCI 106 to the start of the overlapping radio resource (i.e., the overlapping part) must be longer than the process time that the UE 2a needs to process the third DCI 106.

For example, as shown in FIG. 6, after allocating the second uplink radio resource to the UE 2b, the BS 1 determines whether the first uplink signal might not be decoded successfully if the UE 2a cancels transmitting the segment, corresponding to the overlapping part (i.e., OFDM symbols S5-S6), of the first uplink signal and only uses the OFDM symbols S7-S14 to transmit the first uplink signal. Then, the BS 1 alternatively schedules and allocates the uplink radio resource R1 to the UE 2a for transmitting the complete first uplink signal. Furthermore, if the first uplink signal is encoded at a higher code rate or the overlapping part occupies too much of the first uplink radio resource, there is a lower probability that the contents of the first uplink signal can still be decoded by the BS 1 based on the other received part of the first uplink signal. In such a case, it is the best decision that the BS 1 re-schedules and re-allocates the uplink radio resource R1 to the UE 2a for transmitting the first uplink resource if the UE 2a is not in urgent need of transmitting the first uplink signal, thereby the resource would not be wasted (i.e., avoiding the unnecessary signal transmission and signal processing).

Figure 7:
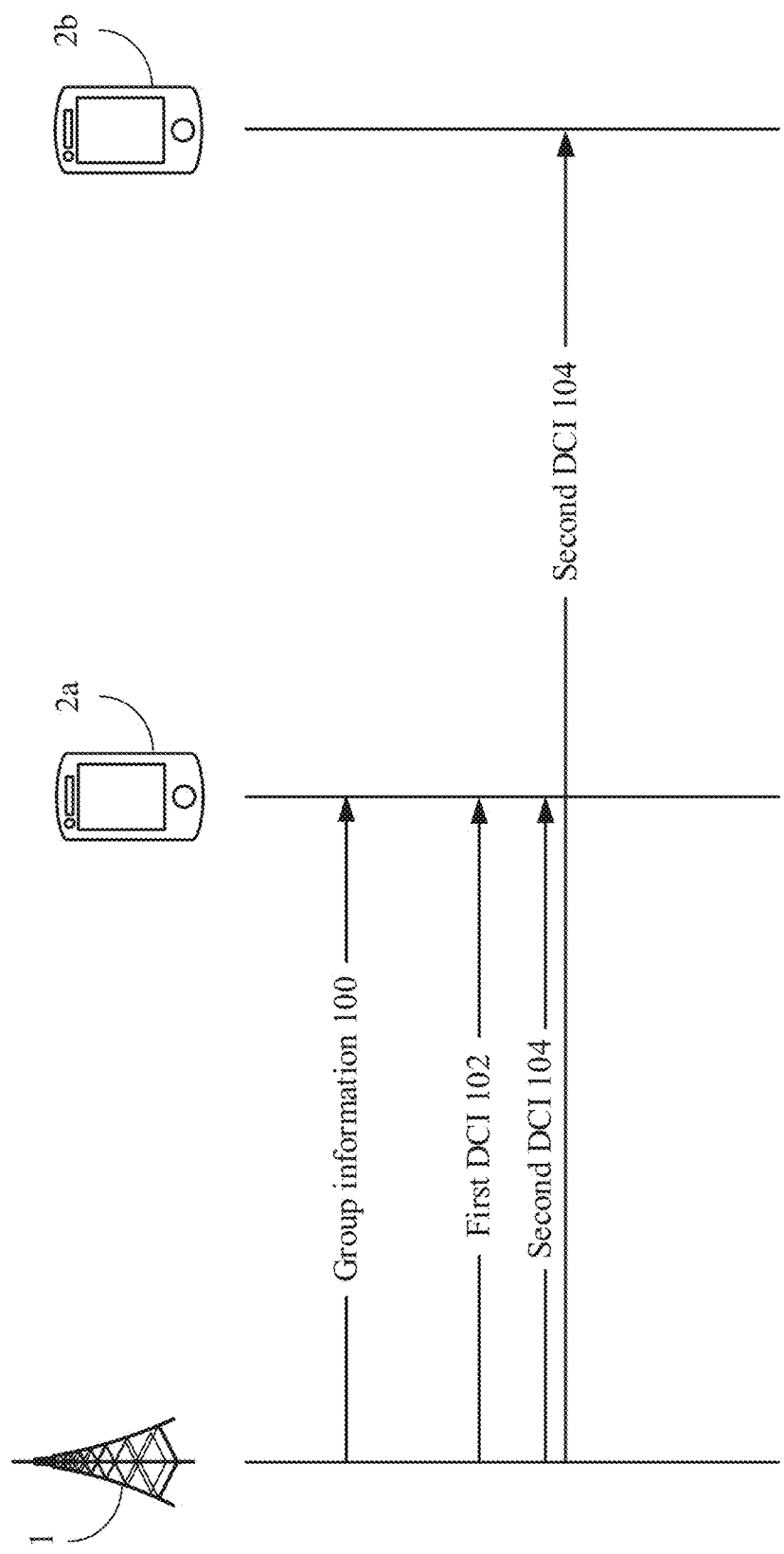
FIG. 7 depicts an implementation scenario of signal transmission between the BS 1 and the UEs 2a, 2b according to the present invention.
Figure 8:
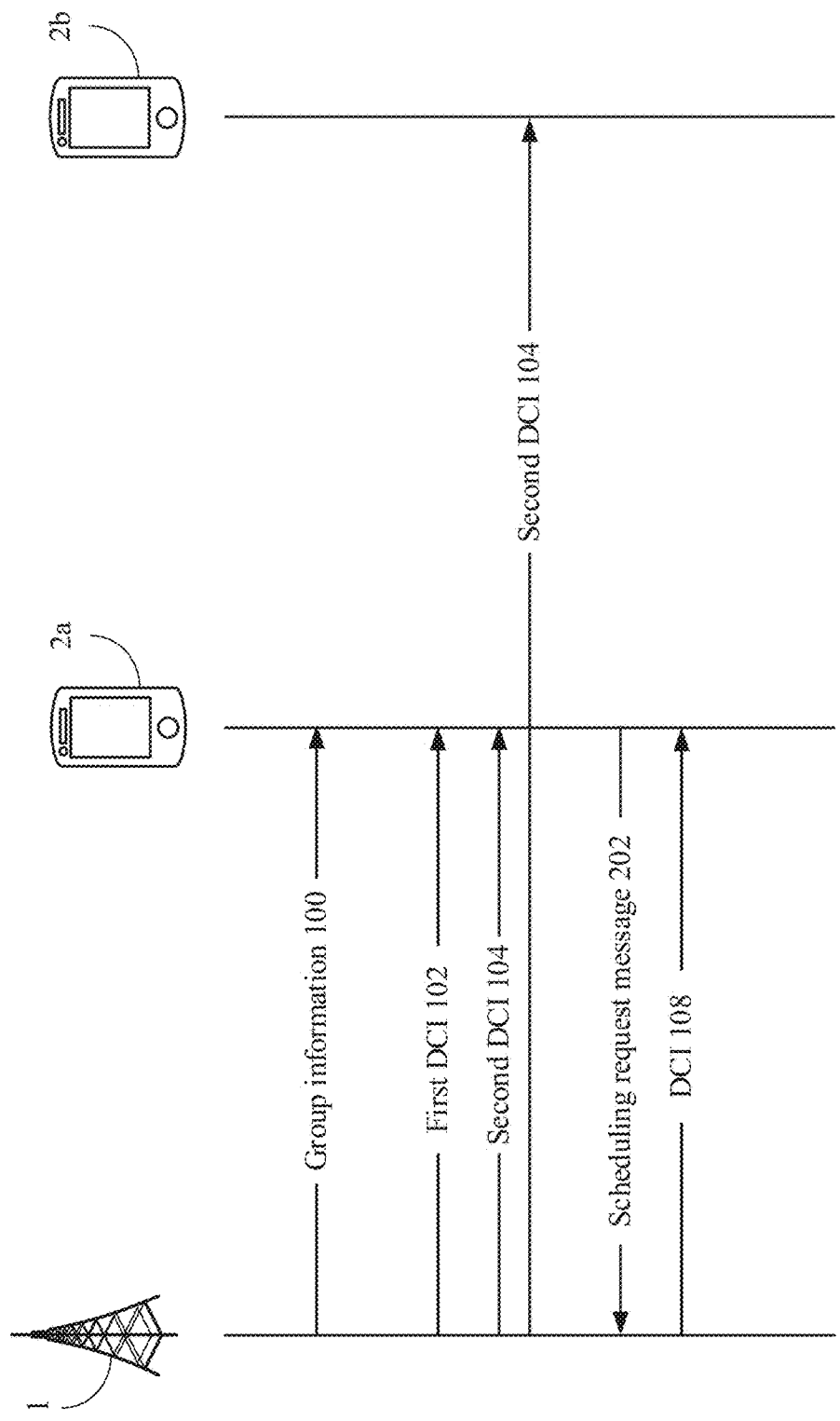
FIG. 8 depicts an implementation scenario of signal transmission between the BS 1 and the UEs 2a, 2b according to the present invention.

A sixth embodiment of the present invention is as shown in FIGS. 7-8. Unlike the first embodiment, the UE 2a in this embodiment needs to determine whether the second uplink radio resource has an overlapping part with the first uplink radio resource, and decides whether to transmit the first uplink signal and the transmission method to transmit the first uplink signal.

In detail, the BS 1 in this embodiment would not transmit the DCI including the transmission adjustment information to the UE with low priority initiatively; instead, the UE with low priority would continuously monitor the UE-specific DCI transmitted to the UE with high priority initiatively. To achieve this end, the BS 1 would configure a group including multiple UEs with low priority and a UE with high priority (e.g., the UEs 2a, 2b, 2c form a group, where the UEs 2a, 2c are the UEs with low priority and the UE 2b is the UE with high priority). After the group has been configured, the BS 1 generates group information 100. Similarly, the BS 1 may inform the UEs 2a, 2c about the group information 100 through the higher layer signaling.

It shall be noted that, the members forming the group are not limited to multiple UEs with low priority and a single UE with high priority, that is to say, the members of the group may include multiple UEs with high priority in other embodiments. In this case, the UE with low priority may continuously monitor each UE-specific DCI transmitted to every UE with high priority. Monitoring the multiple UE-specific DCI will increase the process load at the UE, but the BS 1 can avoid the transmission of the DCI including the transmission adjustment information (i.e., saving the radio resources for transmitting the DCI including the transmission adjustment information).

The group information 100 includes the identifier of each UE with high priority (e.g., the second identifier of the UE 2b). After receiving the group information 100 from the BS 1, the UE 2a continuously monitors the second DCI 104 transmitted to the UE 2b according to the second identifier of the UE 2b. Thus, in this embodiment, both of the first DCI 102 and the second DCI 104 are UE specific DCI, and the UE 2a not only receives the first DCI 102 from the BS 1 based on the first identifier of the UE 2a, but also receives the second DCI 104 from the BS 1 based on the second identifier of the UE 2b.

When the UE 2a determines that the second uplink radio resource has an overlapping part with the first uplink radio resource, the UE 2a cancels transmitting a segment of the first uplink signal when the overlapping part exists, where the segment corresponds to the overlapping part. However, when UE 2a determines that the overlapping part occupies too much of the first uplink radio resource, the UE 2a will suspend transmitting the first uplink signal, and transmit a scheduling request message 202 to the BS 1 additionally to request the BS 1 to allocate a new uplink radio resource. In such situation, the UE 2a further receives the DCI 108 indicating an uplink radio resource re-allocated by the BS 1 from the BS 1, and transmits the first uplink signal on the re-allocated uplink radio resource, as shown in FIG. 8.

Besides, in other embodiment, the BS 1 may initiatively evaluate that the overlapping part occupies too much of the first uplink radio resource and directly transmit the DCI 108 to the UE 2a for the UE 2a to transmit the first uplink signal on the re-allocated uplink radio resource without receiving the scheduling request message 202 from the UE 2a. Unlike the previous embodiments, since the UE 2a in this embodiment is capable of monitoring the second DCI 104 to determine whether to suspend transmitting the first uplink signal, the BS 1 does not need to assure that the third DCI 106 must have been received by the UE 2a before the UE 2a transmits the first uplink signal. In other words, the BS 1 in this embodiment is not like the BS 1 in the previous embodiments which should transmit the third DCI 106 to the UE 2a before the UE 2a transmits the first uplink signal to avoid the uplink transmission collision between the UEs 2a, 2b.

Figure 9:
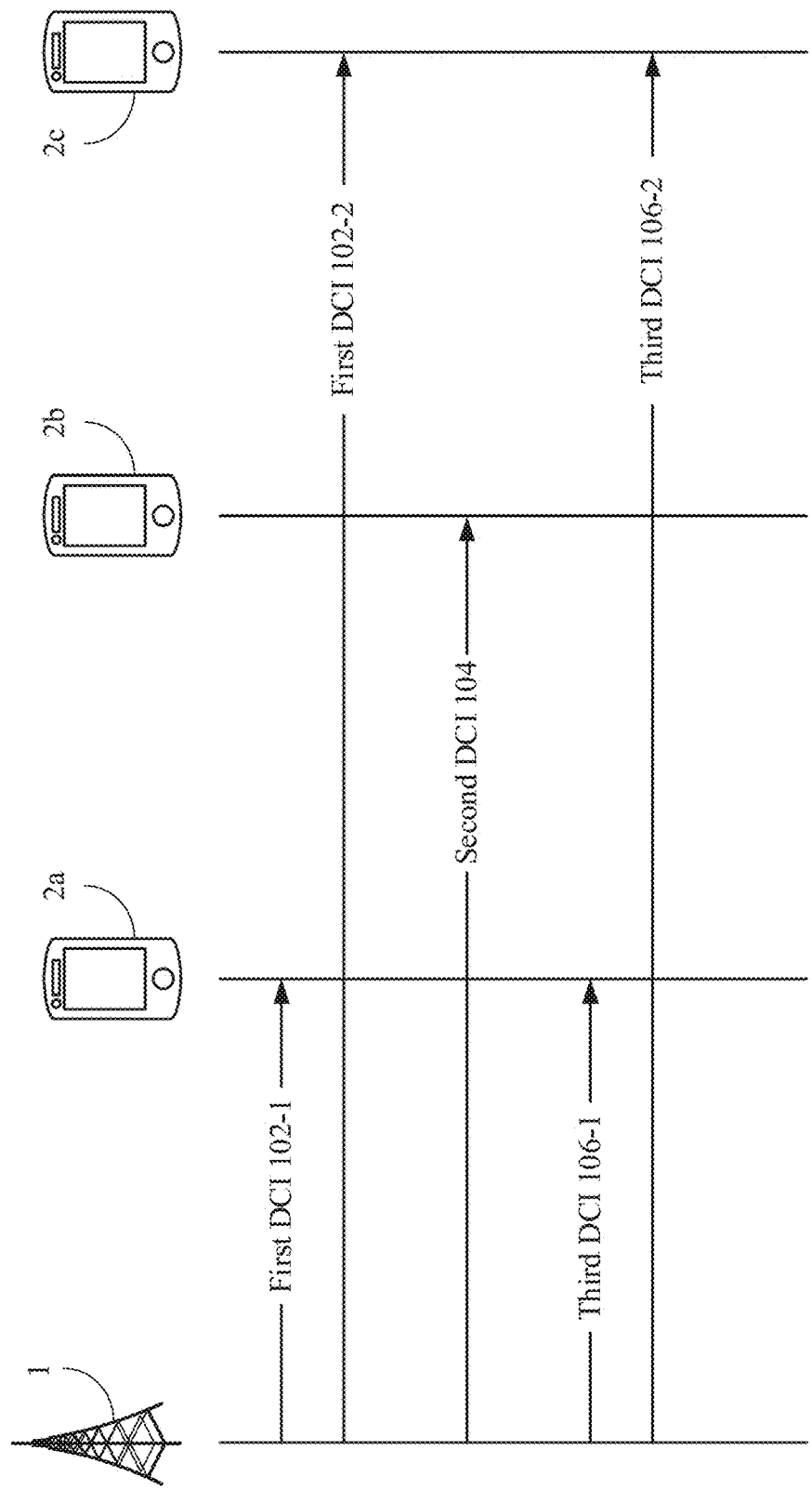
FIG. 9 depicts an implementation scenario of signal transmission between the BS 1 and the UEs 2a, 2b according to the present invention.

A seventh embodiment of the present invention is as shown in FIG. 9. The seventh embodiment is an extension of the first embodiment. The BS 1 transmits first DCI 102-1 to the UE 2a, and first DCI 102-2 to the UE 2c. The first DCI 102-1 indicates a first uplink radio resource for the UE 2a to transmit a first uplink signal, and the first DCI 102-2 indicates another first uplink radio resource for the UE 2c to transmit another first uplink signal. The UE 2c is also a UE with low priority (e.g., an eMBB UE or a URLLC UE with longer tolerable latency).

In this embodiment, when the BS 1 determines that it does not meet the requirement of uplink transmission at the UE 2b if only re-allocating the part of the first uplink radio resource, which has been already allocated to the UE 2a, to the UE 2b, the BS 1 would further re-allocate the part of the another first uplink radio resource, which has been already allocated to the UE 2c, to the UE 2b. In this case, BS 1 should transmit the third DCI 106-1, 106-2 to the UEs 2a, 2c, respectively, before the UEs 2a, 2b transmits the first uplink signals to make them cancel transmitting the first uplink signals on the overlapping part so as to avoid the uplink transmission collision with the UE 2b. How the BS 1 to adjust the uplink radio resources allocated to the UEs 2a, 2b, 2c for them to transmit uplink control signals in this embodiment shall be appreciated by those of ordinary skill in the art based on the description in the previous embodiments and thus will be not further described herein.

It shall be noted that, in other embodiments, the UE 2a may be configured to use discrete Fourier transform-spread OFDM (DFT-s-OFDM) in the uplink transmission. In this case, if the third DCI 106 including the transmission cancellation information indicates that the radio resources on some PRBs within an OFDM symbol cannot be used for transmitting the first uplink signal, the UE 2a will not use the radio resource on all PRBs within this OFDM symbol due to the transmission characteristic of DFT-s-OFDM in which the modulated symbol is spread over the all PRBs indicated by the first DCI 102. In other words, in the case that the first uplink resource allocated to the UE 2a is constructed by multiple OFDM symbols and multiple PRBs, once one PRB of the multiple PRBs within one OFDM symbol of the multiple OFDM symbols has belongs to the unavailable radio resource indicated by the transmission cancellation information, the UE 2a will cancel using the multiple PRBs within this OFDM symbol. As a result, in another embodiment, based on the transmission characteristic of DFT-s-OFDM in which the signal should be transmitted over the continuous PRBs, if the multiple PRBs are still continuous PRBs after subtracting the unavailable PRBs indicated by the transmission cancellation information therefrom, the UE may use the continuous PRBs to transmit the first uplink signal by spreading the modulated symbol over the multiple PRBs in which the unavailable PRBs indicated by the transmission cancellation information are subtracted.

Figure 10A:
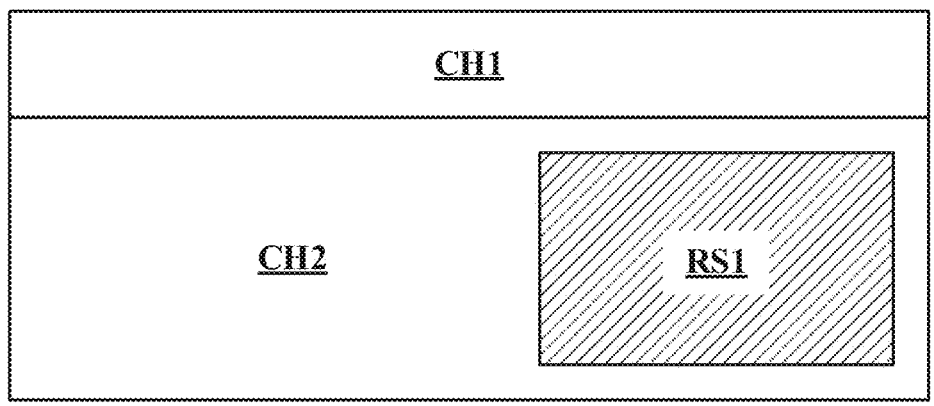
FIGS. 10A-10B depict another implementation scenario of the overlapping part of the uplink radio resources according to the present invention.
Figure 10B:
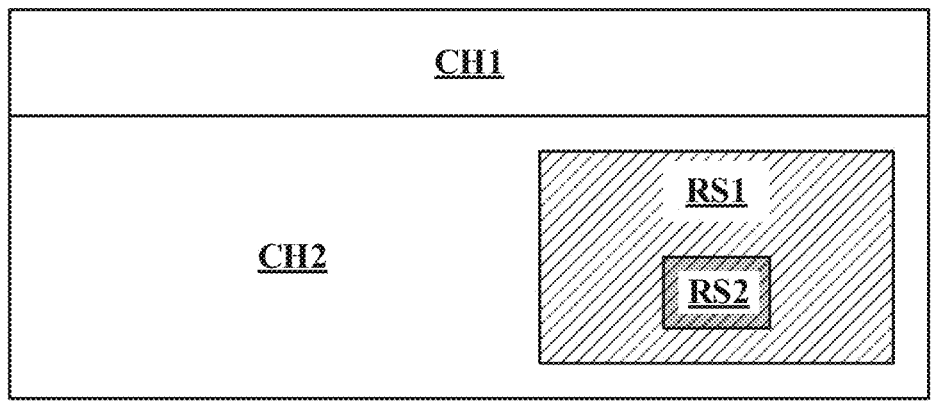

An eighth embodiment of the present invention is as shown in FIGS. 10A-10B. The eighth embodiment is an extension of the first embodiment. Unlike the previous embodiments in which the first uplink signal is an uplink control signal and the first uplink radio resource is located on a PUCCH CH1, in this embodiment, the first uplink signal is an uplink data signal and the first uplink radio resource is located on a physical uplink shared channel (PUSCH) CH2.

As shown in FIG. 10A, the BS 1 allocates the uplink radio resource RS1 of the PUSCH CH2 to the UE 2a for transmitting the first uplink signal. When BS 1 determines that the all radio resources of the PUCCH CH1, which have been already allocated to other UEs, cannot be re-allocated to the UE 2b to meets the transmission requirement of the UE 2b, the BS 1 may re-allocate a partial uplink radio resource (e.g., the uplink radio resource RS2) of the radio resource RS1, which has been allocated to the UE 2a, to the UE 2b for transmitting the second uplink signal, as shown in FIG. 10B.

It shall be noted that, in this embodiment, the overlapping part is the uplink radio resource RS2, the whole of which is a part of the uplink radio resource R1 originally allocated to UE 2a. However, in other embodiments, the BS 1 may re-allocate the uplink radio resource formed by a plurality of small parts, each of which belongs to the different uplink radio resource of the PUSCH CH2 originally allocated to the different UE of the multiple UEs, to the UE 2b. In this way, the proportion of the uplink radio resource which cannot be used for transmitting uplink data by each UE could be decreased.

As mentioned in the first embodiment, the BS 1 will transmit the third DCI 106 to the UE 2a in response to the overlapping part to indicate transmission adjustment information. Similarly, the transmission adjustment information may be the transmission cancellation information, the radio resource re-scheduling information, the radio resource reservation information, the transmission power adjustment information, or the information including both of the radio resource re-scheduling information and the transmission cancellation information. If the contents of the first uplink signal are encoded at a lower code rate, it is tolerable for a larger part of the first uplink signal being received incorrectly so that the transmission adjustment information may be the transmission cancellation information, the transmission power adjustment information or the combination thereof. If the BS 1 evaluates that the overlapping part occupies too much of the first uplink radio resource, the transmission adjustment information may be the radio resource re-scheduling information, or the information including both of the radio resource re-scheduling information and the transmission cancellation information. All operations in this embodiment will be readily appreciated by those of ordinary skill in the art based on the explanation of the aforesaid embodiments, and thus will not be further described herein.

It shall be appreciated that, the aforesaid embodiments only illustrate the examples of: (i) each of the first and second uplink radio resources is located on the PUCCH and each of the first and second uplink signal is an uplink control signal; and (ii) each of the first and second uplink radio resources is located on the PUSCH, the first uplink signal is an uplink data signal, and the second uplink signal is an uplink control signal. However, in other embodiments, each of the first and second uplink radio resources may be located on the PSCCH and each of the first and second uplink signal may be an uplink data signal. Since those of ordinary skill in the art can easily appreciate all operations in the case that each of the first and second uplink radio resources is located on the PSCCH and each of the first and second uplink signal is an uplink data signal, and thus those operations will not be further described herein.

Figure 11:
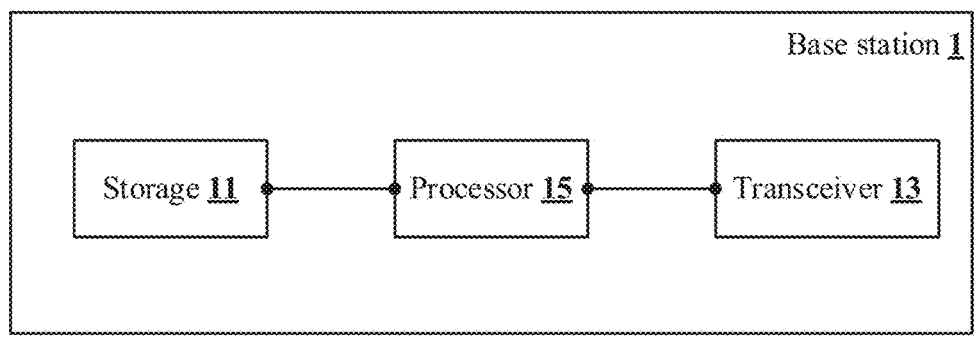
FIG. 11 is a schematic view of the BS 1 according to the present invention.

A ninth embodiment of the present invention is as shown in FIG. 11, which is a schematic view of the BS 1 according to the present invention. The BS 1 comprises a storage 11, a transceiver 13 and a processor 15. The processor 15 is electrically connected to the storage 11 and the transceiver 13. The processor 15 transmits first DCI (e.g., the first DCI 102) to a UE (e.g., the UE 2a) via the transceiver 13. The first DCI indicates a first uplink radio resource for the UE to transmit a first uplink signal. Besides, the processor 15 transmits second DCI (e.g., the second DCI 104) to another UE (e.g., the UE 2b) via the transceiver 13. The second DCI indicates a second uplink radio resource for the another UE to transmit a second uplink signal.

Since the second uplink radio resource has an overlapping part with the first uplink radio resource, the processor 15 transmits third DCI (e.g., the third DCI 106) to the UE in response to the overlapping part. The third DCI indicates transmission adjustment information.

In an embodiment, the first radio resource is located on a PUCCH, and each of the first uplink signal and the second uplink signal is an uplink control signal. Besides, in an embodiment, the first radio resource is located on a PUSCH, the first uplink signal is an uplink data signal, and the second uplink signal is an uplink control signal.

In an embodiment, each of the first and second uplink radio resources may be located on the PUSCH and each of the first and second uplink signal may be an uplink data signal.

In an embodiment, the transmission adjustment information is transmission cancellation information to make the UE cancel transmitting a segment of the first uplink signal according to the transmission cancellation information, and the segment at least includes the overlapping part, as described in the second embodiment.

In an embodiment, the transmission adjustment information is radio resource reservation information to make the UE cancel transmitting a segment of the first uplink signal according to the radio resource reservation information, and the segment at least includes the overlapping part, as described in the third embodiment.

In an embodiment, the transmission adjustment information includes radio resource re-scheduling information and transmission cancellation information, as described in the fourth embodiment. The transmission cancellation information makes the UE cancel transmitting a segment of the first uplink signal according to the transmission cancellation information, where the segment at least includes the overlapping part. The radio resource re-scheduling information makes the UE transmit the segment on a compensating uplink radio resource indicated by the radio resource re-scheduling information accordingly, as described in the fourth embodiment.

In an embodiment, the processor 15 further transmits a configuration message to the UE via the transceiver 13 to make the UE receive the third DCI according to the configuration message. The configuration message indicates a control resource set (CORESET), a search space and at least one physical downlink control channel (PDCCH) candidate.

In an embodiment, the transmission adjustment information is radio resource re-scheduling information. The radio resource re-scheduling information indicates an uplink radio resource to make the UE cancel transmitting the first uplink signal on the first uplink radio resource and transmit the first uplink signal on the uplink radio resource according to the radio resource re-scheduling information, as described in the fifth embodiment.

In an embodiment, the transmission adjustment information is transmission power adjustment information to make the UE adjust transmission power for transmitting the first uplink signal according to the transmission power adjustment information.

Figure 12:
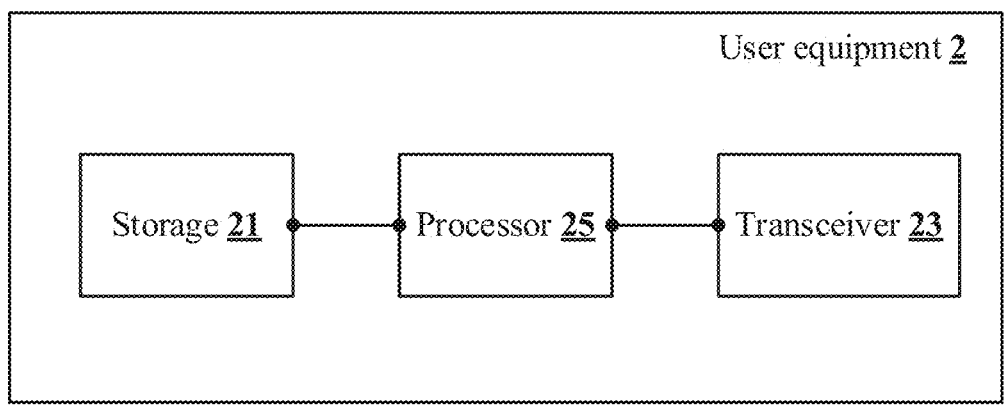
FIG. 12 is a schematic view of the UE 2 according to the present invention.

A tenth embodiment of the present invention is as shown in FIG. 12, which is a schematic view of the UE 2 according to the present invention. The UE 2 comprises a storage 21, a transceiver 23 and a processor 25. The processor 25 is electrically connected to the storage 21 and the transceiver 23. In this embodiment, the UE 2 may be the UE 2a in the first embodiment.

The processor 25 receives DCI (e.g., the first DCI 102) from a BS (e.g., the BS 1) via the transceiver 23. The DCI indicates a first uplink radio resource for the UE 2 to transmit a first uplink signal. The processor 25 receives another DCI (e.g., the third DCI 106) from the BS via the transceiver. The another DCI indicates transmission adjustment information and is generated by the BS in response to allocating a second uplink radio resource to another UE (e.g., the UE 2a). The second uplink radio resource has an overlapping part with the first uplink radio resource.

In an embodiment, the first radio resource is located on a PUCCH, and each of the first uplink signal and the second uplink signal is an uplink control signal. Besides, in an embodiment, the first radio resource is located on a PUSCH, the first uplink signal is an uplink data signal, and the second uplink signal is an uplink control signal.

In an embodiment, the transmission adjustment information is transmission cancellation information, the processor 25 cancels transmitting a segment of the first uplink signal according to the transmission cancellation information, and the segment at least includes the overlapping part, as described in the second embodiment.

In an embodiment, the transmission adjustment information includes radio resource re-scheduling information and transmission cancellation information, as described in the fourth embodiment. The processor 25 cancels transmitting a segment of the first uplink signal according to the transmission cancellation information, where the segment at least includes the overlapping part. The processor 25 transmits the segment on a compensating uplink radio resource indicated by the radio resource re-scheduling information accordingly.

In an embodiment, the processor 25 further receives a configuration message from the BS via the transceiver 23 so as to receive the another DCI according to the configuration message, and the configuration message indicates a CORESET, a search space and at least one PDCCH candidate.

In an embodiment, the transmission adjustment information is radio resource re-scheduling information, the radio resource re-scheduling information indicates an uplink radio resource, and the processor 25 cancels transmitting the first uplink signal on the first uplink radio resource and transmits the first uplink signal on the uplink radio resource according to the radio resource re-scheduling information, as described in the fifth embodiment.

In an embodiment, the transmission adjustment information is transmission power adjustment information, and the processor 25 adjusts transmission power for transmitting the first uplink signal according to the transmission power adjustment information.

Still refer to FIG. 12 for an eleventh embodiment of the present invention. In this embodiment, the UE 2 may be the UE 2a in the sixth embodiment. The storage stores a first identifier of the UE. The processor 25 receives group information (e.g., the group information 100) from a BS (e.g., the BS 1) via the transceiver 23. The group information includes a second identifier of another UE (e.g., the UE 2b).

The processor 25 receives first DCI (e.g., the first DCI 102) from the BS via the transceiver 23 based on the first identifier. The first DCI indicates a first uplink radio resource for the UE 2 to transmit a first uplink signal. Afterwards, the processor 25 receives second DCI (e.g., the second DCI 104) from the BS via the transceiver 23 based on the second identifier. The second DCI indicates a second uplink radio resource for the another UE to transmit a second uplink signal. The processor 25 determines whether the second uplink radio resource has an overlapping part with the first uplink radio resource. In addition, the processor 25 decides whether to transmit the first uplink signal and decides a transmission method for transmitting the first uplink signal based on whether the overlapping part exists.

In an embodiment, the first radio resource is located on a PUCCH, and each of the first uplink signal and the second uplink signal is an uplink control signal. Besides, in an embodiment, the first radio resource is located on a PUSCH, the first uplink signal is an uplink data signal, and the second uplink signal is an uplink control signal.

In an embodiment, each of the first and second uplink radio resources may be located on the PUSCH and each of the first and second uplink signal may be an uplink data signal.

In an embodiment, the processor 25 cancels transmitting a segment of the first uplink signal when the overlapping part exists, and the segment corresponds to the overlapping part.

In an embodiment, the processor 25 suspends transmitting the first uplink signal when the overlapping part exists, receives DCI indicating an uplink radio resource from the BS via the transceiver 23, and transmits the first uplink signal on the uplink radio resource via the transceiver 23 according to the DCI.

According to the above descriptions, the uplink radio resource scheduling and allocation mechanism of the present invention may enable the base station to re-allocate a part of the uplink radio resource, which have been allocated to the other UE, to the URLLC UE when the URLLC UE needs to timely transmit the uplink signal, and enables the base station to command the other UE to cancel the transmission on the part of the uplink radio resource. Therefore, the present invention enables the UE with shorter tolerable latency to timely obtain the uplink radio resource for transmitting the uplink signal without raising the collision issue in uplink signal transmission between the UE and the other UE, thereby improving the radio resource utilization efficiency and meeting the requirement of ultra-reliability and low latency.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A base station (BS) for a mobile communication system, comprising:
    a storage;
    a transceiver; and
    a processor electrically connected to the storage and the transceiver, being configured to execute the following operations:
        transmitting first downlink control information (DCI) to a user equipment (UE) via the transceiver, the first DCI indicating a first uplink radio resource for the UE to transmit a first uplink signal;
        transmitting second DCI to another UE via the transceiver, the second DCI indicating a second uplink radio resource for the another UE to transmit a second uplink signal, the second uplink radio resource having an overlapping part with the first uplink radio resource; and
        transmitting third DCI to the UE in response to the overlapping part, the third DCI indicating transmission adjustment information.

2. The base station of claim 1, wherein the first radio resource is located on a physical uplink control channel (PUCCH), and each of the first uplink signal and the second uplink signal is an uplink control signal.

3. The base station of claim 1, wherein the first radio resource is located on a physical uplink shared channel (PUSCH), the first uplink signal is an uplink data signal, and the second uplink signal is an uplink control signal.

4. The base station of claim 1, wherein the transmission adjustment information is transmission cancellation information to make the UE cancel transmitting a segment of the first uplink signal according to the transmission cancellation information, and the segment at least includes the overlapping part.

5. The base station of claim 1, wherein the transmission adjustment information is radio resource reservation information to make the UE cancel transmitting a segment of the first uplink signal according to the radio resource reservation information, and the segment at least includes the overlapping part.

6. The base station of claim 1, wherein the processor further transmits a configuration message to the UE via the transceiver to make the UE receive the third DCI according to the configuration message, and the configuration message indicates a control resource set (CORESET), a search space and at least one physical downlink control channel (PDCCH) candidate.

7. The base station of claim 1, wherein the transmission adjustment information is radio resource re-scheduling information, and the radio resource re-scheduling information indicates an uplink radio resource to make the UE cancel transmitting the first uplink signal on the first uplink radio resource and transmit the first uplink signal on the uplink radio resource according to the radio resource re-scheduling information.

8. The base station of claim 1, wherein the transmission adjustment information is transmission power adjustment information to make the UE adjust transmission power for transmitting the first uplink signal according to the transmission power adjustment information.

9. The base station of claim 8, wherein the second DCI further indicates another transmission adjustment information to make the another UE adjust another transmission power for transmitting the second uplink signal according to the another transmission power adjustment information.

10. A user equipment (UE) for a mobile communication system, comprising:
    a storage;
    a transceiver; and
    a processor electrically connected to the storage and the transceiver, being configured to execute the following operations:
        receiving DCI from a base station (BS) via the transceiver, the DCI indicating a first uplink radio resource for the UE to transmit a first uplink signal; and
        receiving another DCI from the BS via the transceiver, the another DCI indicating transmission adjustment information and being generated by the BS in response to allocate a second uplink radio resource to another UE, the second uplink radio resource having an overlapping part with the first uplink radio resource.

11. The user equipment of claim 10, wherein the first radio resource is located on a PUCCH, and each of the first uplink signal and the second uplink signal is an uplink control signal.

12. The user equipment of claim 10, wherein the first radio resource is located on a PUSCH, the first uplink signal is an uplink data signal, and the second uplink signal is an uplink control signal.

13. The user equipment of claim 10, wherein the transmission adjustment information is transmission cancellation information, the processor cancels transmitting a segment of the first uplink signal according to the transmission cancellation information, and the segment at least includes the overlapping part.

14. The user equipment of claim 10, wherein the processor further receives a configuration message from the BS via the transceiver so as to receive the another DCI according to the configuration message, and the configuration message indicates a CORESET, a search space and at least one PDCCH candidate.

15. The user equipment of claim 10, wherein the transmission adjustment information is radio resource re-scheduling information, the radio resource re-scheduling information indicates an uplink radio resource, and the processor cancels transmitting the first uplink signal on the first uplink radio resource and transmits the first uplink signal on the uplink radio resource according to the radio resource re-scheduling information.

16. The user equipment of claim 10, wherein the transmission adjustment information is transmission power adjustment information, and the processor adjusts transmission power for transmitting the first uplink signal according to the transmission power adjustment information.

17. A user equipment (UE) for a mobile communication system, comprising:
a storage, being configured to store a first identifier of the UE;
a transceiver; and
a processor electrically connected to the storage and the transceiver, being configured to execute the following operations:
receiving group information from a base station (BS) via the transceiver, the group information including a second identifier of another UE;
receiving first DCI from the BS via the transceiver based on the first identifier, the first DCI indicating a first uplink radio resource for the UE to transmit a first uplink signal;
receiving second DCI from the BS via the transceiver based on the second identifier, the second DCI indicating a second uplink radio resource for the another UE to transmit a second uplink signal;
determining whether the second uplink radio resource has an overlapping part with the first uplink radio resource; and
deciding whether to transmit the first uplink signal and deciding a transmission method for transmitting the first uplink signal based on whether the overlapping part exists.

18. The user equipment of claim 17, wherein the first radio resource is located on a PUCCH, and each of the first uplink signal and the second uplink signal is an uplink control signal.

19. The user equipment of claim 17, wherein the first radio resource is located on a PUSCH, the first uplink signal is an uplink data signal, and the second uplink signal is an uplink control signal.

20. The user equipment of claim 17, wherein the processor cancels transmitting a segment of the first uplink signal when the overlapping part exists, and the segment corresponds to the overlapping part.

21. The user equipment of claim 17, wherein the processor suspends transmitting the first uplink signal when the overlapping part exists, receives DCI indicating an uplink radio resource from the BS via the transceiver, and transmits the first uplink signal on the uplink radio resource via the transceiver according to the DCI.

* * * * *